United States Patent [19]
Bonnesen et al.

[11] Patent Number: 5,369,543
[45] Date of Patent: Nov. 29, 1994

[54] THYRISTOR FAIL-SAFE DEVICE

[75] Inventors: John S. Bonnesen, Eden Prairie; James D. Dewey, Plymouth, both of Minn.

[73] Assignee: ADC Telecommunications, Inc., Minneapolis, Minn.

[21] Appl. No.: 930,152

[22] Filed: Aug. 13, 1992

[51] Int. Cl.<sup>5</sup> ............................................. H02H 1/04
[52] U.S. Cl. ..................................... 361/117; 361/119
[58] Field of Search ............... 361/119, 126, 127, 111, 361/110, 115, 117, 118, 124

[56] References Cited

U.S. PATENT DOCUMENTS

| 4,652,964 | 3/1987 | Ziegenbein | 361/54 |
| 4,866,563 | 9/1989 | Howard et al. | 361/124 |
| 4,876,621 | 10/1989 | Rust et al. | 361/58 |
| 5,155,649 | 10/1992 | Hung et al. | 361/119 |
| 5,155,650 | 10/1992 | Pitsch et al. | 361/119 |

FOREIGN PATENT DOCUMENTS 3621200 1/1988 Germany .
142774 7/1990 Germany .

Primary Examiner—Jeffrey A. Gaffin
Assistant Examiner—Ronald W. Leja
Attorney, Agent, or Firm—Merchant, Gould, Smith, Edell, Welter & Schmidt

[57] ABSTRACT

A fail-safe device is provided for use with a thyristor having a main body sandwiched between electrically conductive end plates. The fail-safe device includes a spring body formed of electrically conductive material having contact surfaces bent about a central fold. The thyristor is placed between the contact surfaces with the end plates in electrical opposition to each contact surface. A conductor plate is disposed between one of the end plates and one of the contact surfaces. The conductor plate includes a lead for electrical connection to the circuit to be protected. The spring body includes a lead for electrical connection to an electrical ground. A dielectric spacer is disposed between the conductor plate and the contact surface. The dielectric spacer is selected to deform in response to an elevated temperature generated by the thyristor during an over-voltage condition.

9 Claims, 5 Drawing Sheets

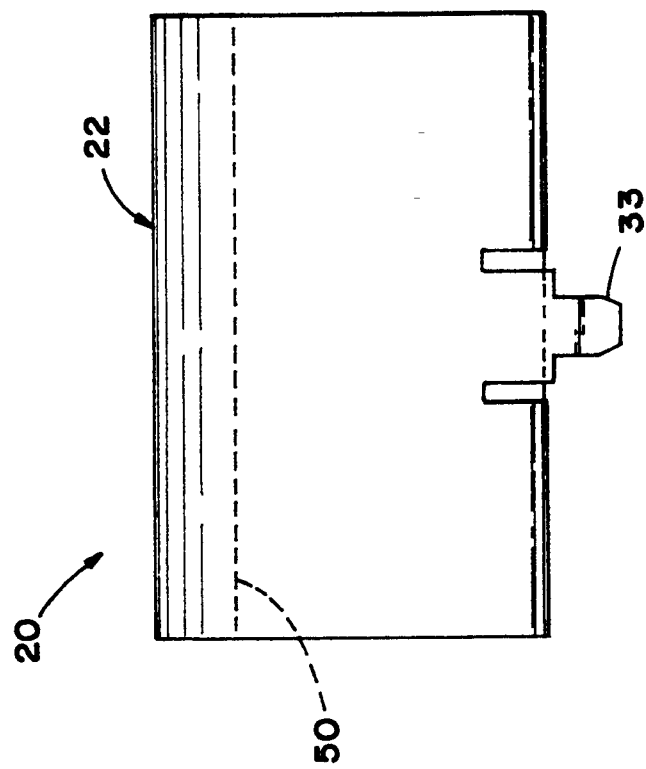
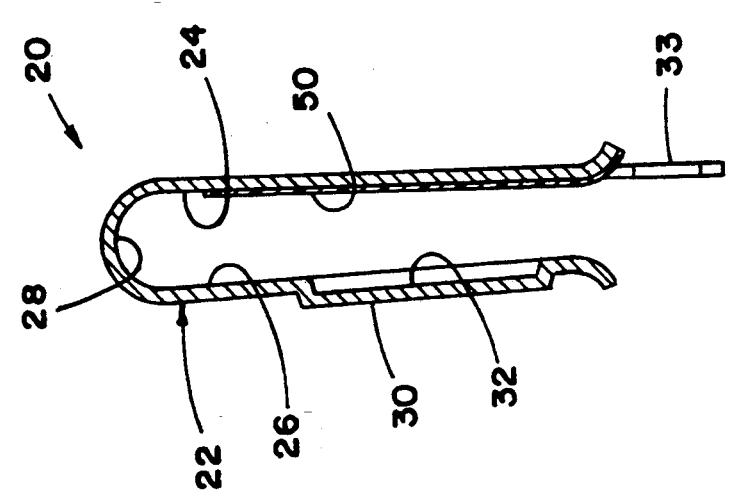

THYRISTOR FAIL-SAFE DEVICE

BACKGROUND OF THE INVENTION

1. Field of the Invention

This invention pertains to a fail-safe device for use principally in the telecommunications field. More particularly, this invention pertains to a fail-safe device for use in conjunction with a thyristor to provide a connection to an electrical ground in response to a sustained over-voltage condition.

2. Description of the Prior Art

The use of fail-safe devices in the telecommunications field is well known. A common device is shown in U.S. Pat. No. 4,866,563 to Howard et al. dated Sep. 12, 1989. The fail-safe device of U.S. Pat. No. 4,866,563 utilizes a gas discharge tube which, in response to a sustained over-voltage condition, attains an elevated temperature. When the elevated temperature is attained, pellets (items 5 and 6 in the patent) melt causing a spring to be urged into electrical contact with conductive surfaces on the gas discharge tube. This results in connecting the conductive surfaces to ground.

In addition to such gas discharge tube fail-safe devices, the telecommunications industry may utilize solid state overvoltage protection devices. An example of a solid state overvoltage protection device is a thyristor which attains an elevated temperature in response to a sustained over-voltage condition. A thyristor utilized in a fail-safe device is shown in commonly assigned co-pending U.S. patent application Ser. No. 07/811,878, filed Dec. 19, 1991, now U.S. Pat. No. 5,155,650.

It is an object of the present invention to provide a fail-safe device for use with a thyristor with improved responsiveness and grounding following a sustained over-voltage condition.

SUMMARY OF THE INVENTION

According to a preferred embodiment of the present invention a fail-safe device is provided for a thyristor having a main body disposed between first and second electrically conductive end plates. The thyristor is characterized by its attaining a predetermined elevated temperature in response to a sustained over-voltage condition. The fail-safe device comprises a spring body formed of electrically conductive material and having opposing first and second contact surfaces biased toward one another. The thyristor is disposed between the first and second contact surfaces with the first end plate in electrical contact with the first contact surface and with the second contact surface biased toward the second end plate. A conductor plate of electrically conductive material is provided having a contact end disposed between the second contact surface and the second end plate. The conductor plate is in electrical communication with the second end plate. The spring body is electrically connected to an electrical ground. The conductor plate is electrically connected to the circuit to be protected. A dielectric spacer is disposed between the conductor plate and the second contact surface. The spacer is formed of material selected to deform in response to the elevated temperature to permit movement of the second contact surface toward the second end plate for electrical communication.

BRIEF DESCRIPTION OF THE DRAWINGS

FIG. 7 is a view taken along line 7—7 of FIG. 6;

FIG. 8 is a rear side elevation view of the spring of FIG. 5;

DESCRIPTION OF THE PREFERRED EMBODIMENT

Referring now to the several drawing figures in which identical elements are numbered identically throughout, a description of the preferred embodiment of the present invention will now be provided.

The present invention pertains to a fail-safe device 10. The device is intended for use with commercially available thyristors 12, 12'. While the preferred use of the present invention is with thyristors 12, 12', it will be appreciated by those skilled in the art that the teachings of the present invention could be utilized with conventional gas discharge tubes.

Figure 1:
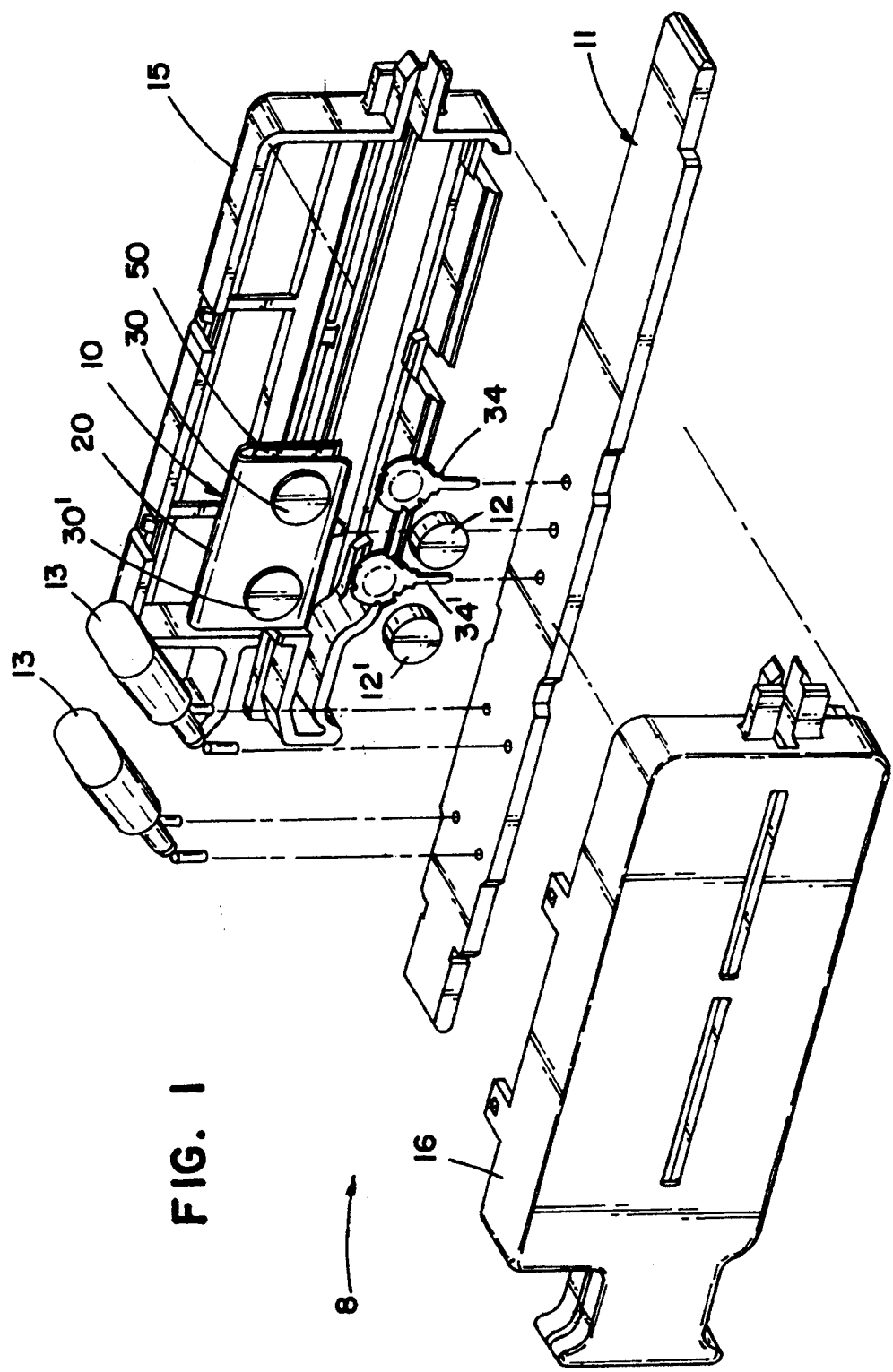
FIG. 1 is an exploded perspective view of a protection device carrying a fail-safe protector according to the present invention.
Figure 2:
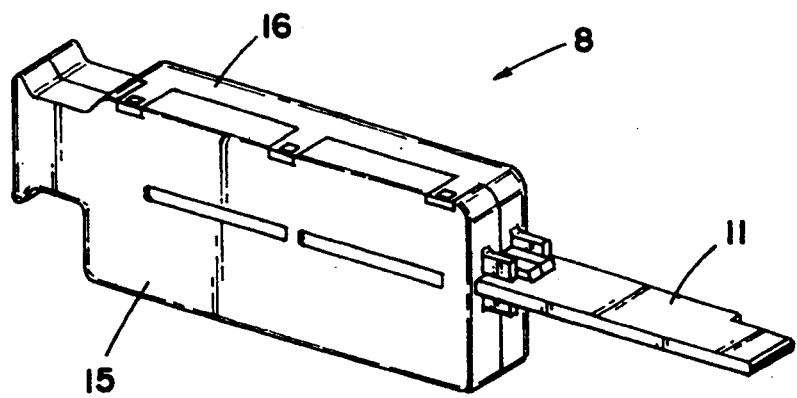
FIG. 2 is an assembled perspective view of the device of FIG. 1.

FIG. 1 is a perspective exploded view of a circuit protector 8 utilizing the fail-safe device 10. In FIG. 1, a printed circuit board 11 is shown. The fail-safe device 10 is connected to the printed circuit board 11. Additional circuit components 13 may be connected to the circuit board 11. The circuit components 13 do not form an element of the fail-safe device 10 and require no further explanation for an understanding of the present invention. The fail-safe device 10 and circuit components 13 may be enclosed within a housing including housing halves 15 and 16. The assembled protection device 8 is shown in FIG. 2.

Figure 3:
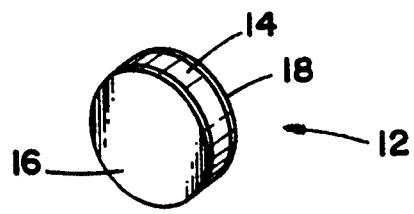
FIG. 3 is a perspective view of a thyristor for use with the present invention.
Figure 5:
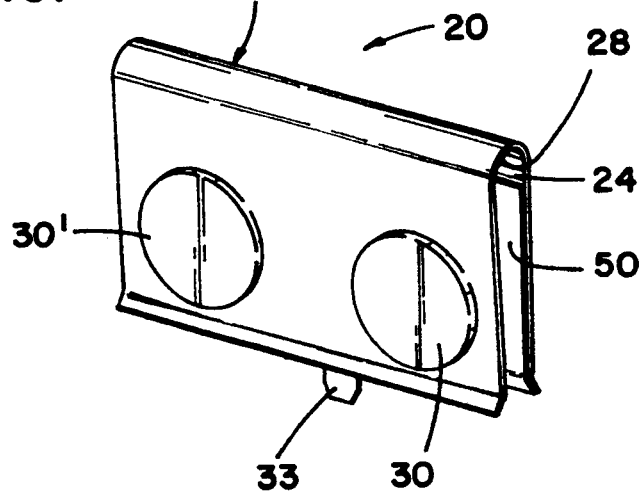
FIG. 5 is a perspective view of a spring for use with the present invention.
Figure 6:
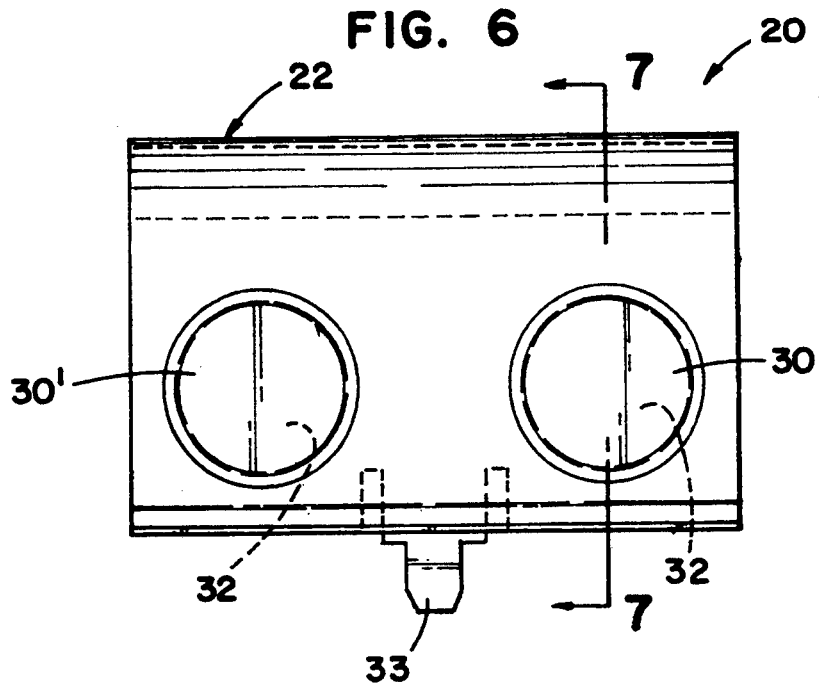
FIG. 6 is a front side elevation view of the spring of FIG. 5.

The thyristors 12, 12' are identical. With reference to FIG. 3, the thyristor 12 includes a central body 14 sandwiched between a first electrically conductive end plate 16 and a second electrically conductive end plate 18. Accordingly, the thyristor 12 takes on a disc appearance.

Thyristors such as those shown are commercially available. An example of such is product KB10R14 made by Shindengen Company of Tokyo, Japan. The thyristors 12, 12' are characterized by their attaining an elevated temperature in response to a sustained over-voltage condition.

Figure 4:
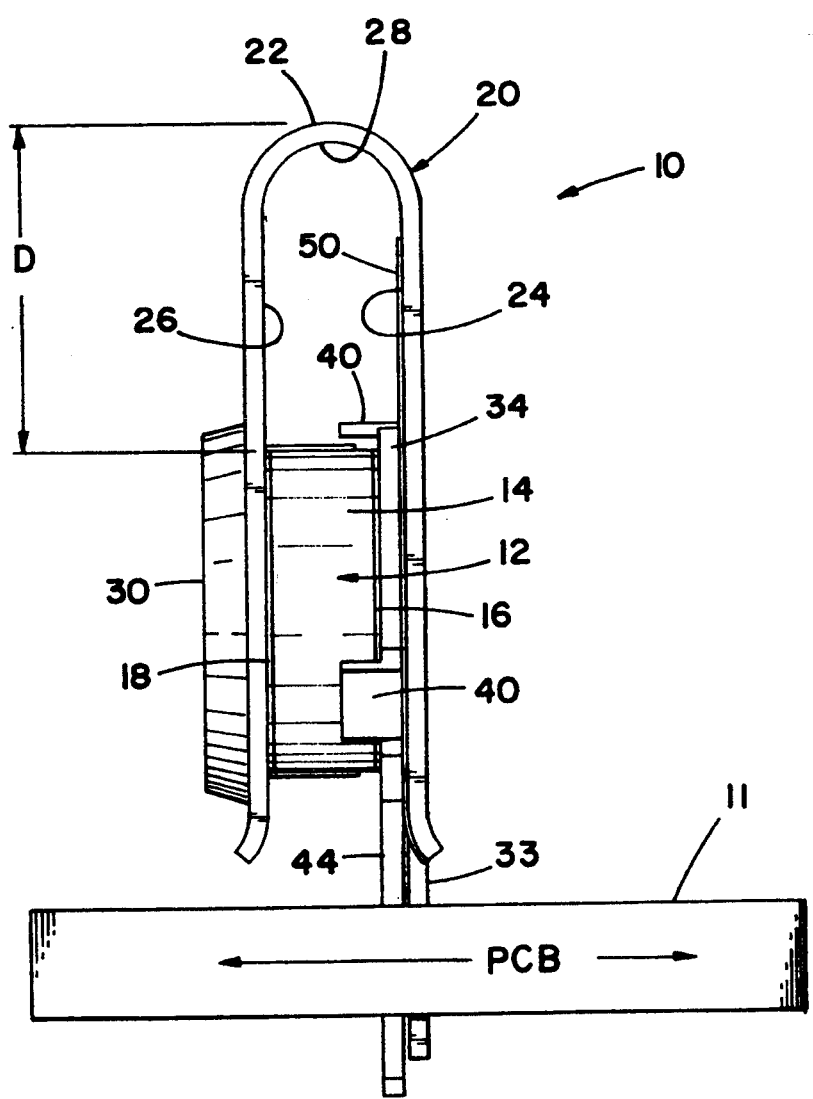
FIG. 4 is an end elevation view of the fail-safe device of the present invention.

With reference to FIG. 4, the fail-safe device 10 includes a ground spring 20. The ground spring is formed of electrically conductive metal. The ground spring 20 has a spring body 22 including a first contact surface 24 and a second contact surface 26. The surfaces, 24, 26 are joined by a generally inverted U-shaped fold 28. Surface 26 is biased toward surface 24. On surface 26, two pockets 30, 30' are formed. Each of the pockets 30, 30' are formed and sized to receive thyristors 12, 12' with the second end plates 18, 18' abutting the pocket walls 32, 32' in electrically conductive contact.

Spring body 22 is formed such that at a rest position (see FIG. 7), the distance between spring surfaces 24, 26 is less than the axial distance between the outer surfaces of the first and second end plates 16, 18. Accordingly, placement of the thyristors 12, 12' within pockets 30, 30' forces surface 26 away from surface 24 against the natural bias of the ground spring 20. With the thyristors 12, 12' disposed within pocket 30, 30', end plates 16, 16' oppose surface 24.

As best shown in FIGS. 4 and 7, the distance, D, between the thyristors 12, 12' and the fold 28 is selected such that the surfaces 24, 26 retain a general parallel alignment in the stroke of travel from the stressed position shown in FIG. 4 to a rest position shown in FIG. 7. It can also be seen in FIG. 4 that the thyristors 12, 12', the surfaces 24, 26 and the contact pairs which they form are in a general linear alignment.

The spring 20 includes a lead 33 extending from surface 24. Lead 33 permits connection of the spring 20 to an electrical ground of a circuit (not shown) carried on board 11.

Conductor plates 34, 34' are provided for each of thyristors 12, 12'. Conductor plates 34, 34' are identical and a description of conductor plate 34 will suffice as a description of conductor plate 34'.

Figure 11:
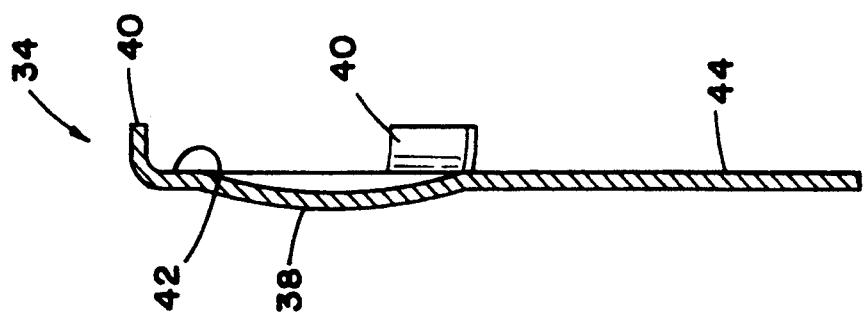
FIG. 11 is a view taken along line 11—11 of FIG. 10.
Figure 10:
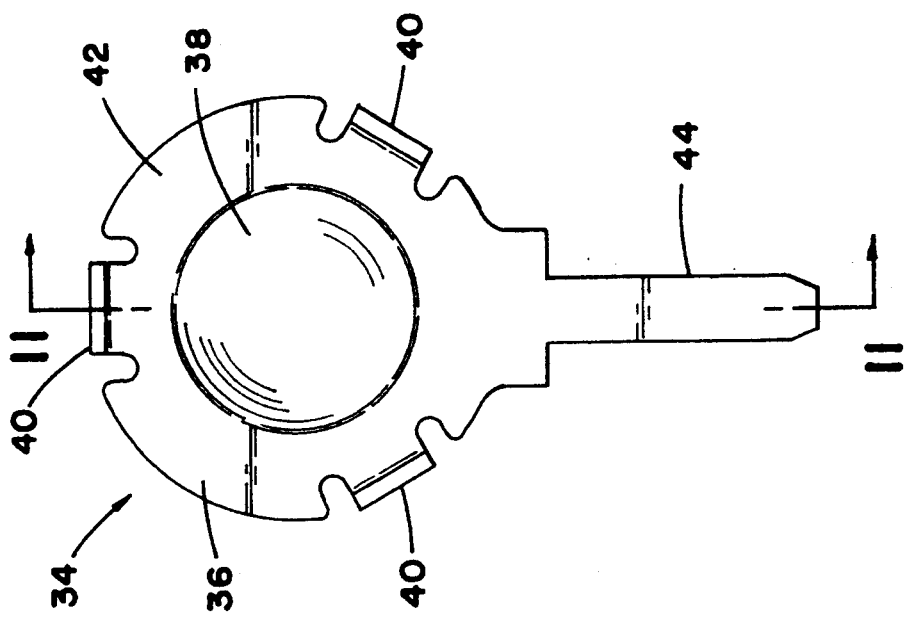
FIG. 10 is a front elevation view of the conductor plate of FIG. 9.
Figure 9:
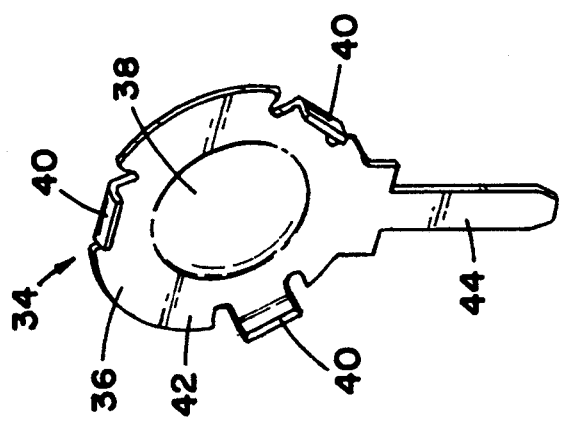
FIG. 9 is a perspective view of a conductor plate for use with the present invention.

With reference to FIGS. 9-11, conductor plate 34 includes a generally circular body 36 having a diameter sized to approximate a diameter of the first end plate 16. Axially disposed on the body 36 is a raised area 38 (the function of which will be described) surrounded by an annular ring 42.

Also provided on body 36 are three inwardly protruding tabs 40 protruding opposite of the direction of protrusion of the raised area 38. The tabs 40 permit placement of the conductor plate 34 on a thyristor 12 with the end plate 16 abutting the annular ring 42 of the body 36 in electrically conductive manner with tabs 40 preventing a thyristor 12 from sliding out of conductor plate 34. The conductor plate 34 includes an electrical lead 44 to permit electrical connection of the conductor plate to a circuit (not shown) to be protected carried on board 11. As shown in FIG. 4, the conductor plate 34 is disposed between the end plate 16 and surface 24.

The fail-safe device also includes a dielectric spacer 50 (shown only in FIGS. 1, 4 and 7). In the preferred embodiment, the dielectric spacer 50 is a piece of an adhesive-backed dielectric plastic such as polyester tape. Polyester tapes are well known commercially available products. For example, such tapes are available through 3M Company, St. Paul, Minn.

The polyester tape 50 is adhered to the surface 24 between the conductor plates 34, 34' and surface 24. The polyester tape is selected such that upon the thyristors 12, 12' achieving an elevated temperature in response to an over-voltage condition, the polyester tape 50 will melt. Upon melting of the polyester tape, surface 26 moves toward surface 24 such that surface 24 will electrically contact the raised area 38 of conductor plate 34. The raised area 38 permits the melted material of the polyester tape 50 to be displaced and permit sound electrical contact. As a result of such contact, both end plates 18, 16 as weal as the conductor plates 34, 34' are connected to ground.

With the structure as described, a fail-safe device having enhanced reliability and responsiveness to an over-voltage condition is provided. Accordingly, the objects of the invention have been achieved in a preferred manner. While the foregoing description is a description of a preferred embodiment, it will be appreciated that modifications and equivalents of the enclosed concepts may be apparent to one of ordinary skill in the art having the benefit of the teachings of the present invention. Accordingly, it is intended that the scope of the present invention not be limited to the preferred embodiment shown, but shall include such modifications and equivalents.

What is claimed is:

1. A fail-safe device for use with a thyristor having a main body disposed between first and second electrically conductive end plates, said thyristor characterized by said thyristor having a predetermined elevated temperature in response to a sustained over-voltage condition, said device comprising:
   (a) a spring body formed of electrically conducted material and having a first contact surface and an opposing second-contact surface resiliently biased toward said first contact surface;
   (b) said thyristor disposed between said first and second contact surfaces with said second end plate in electrical contact with said second contact surface and with said first contact surface biased toward said first end plate;
   (c) a first electrically conductive lead connected to said spring body for connecting said spring body to an electrical ground;
   (d) an electrically conductive conductor plate disposed between said first contact surface and said first end plate and in electrical communication with said first end plate;
   (e) a second electrically conductive lead for electrically connecting said conductor plate to a circuit to be protected;
   (f) said second end plate and said second contact surface defining a first conductive pair of contacts, said conductor plate and said first contact surface defining a second conductive pair of contacts and said conductor plate and said first contact surface defining a third conductive pair of contacts, each of said pairs being in general linear alignment;
   (g) a dielectric spacer disposed between contacts of at least one of said first, second and third pairs, said spacer formed of material selected to deform in response to said elevated temperature and permit movement of said contacts of said at least one pair toward electrical contact.

2. A device according to claim 1 wherein said at least one pair is said third pair and said spacer is disposed between said conductor plate and said first contact surface.

3. A device according to claim 2 wherein said conductor plate includes a first surface electrically contacting said first end plate and a second surface opposing said first contact surface, said electrical contact between said first end plate and said first contact surface attained by said first contact surface electrically contacting said second surface of said conductor plate.

4. A device according to claim 2 wherein said dielectric spacer is a dielectric film deposited on said first contact surface.

5. A device according to claim 1 wherein said spring body is a sheet of electrically conductive material folded at a bend disposed between said first and second contact surfaces.

6. A device according to claim 5 comprising a plurality of said thyristors disposed between said first and second contact surfaces with said thyristors disposed in generally side-by-side relation with each of said thyristors opposing said first and second contact surfaces and with each of said thyristors provided with a separate conductor plate.

7. A device according to claim 1 wherein said second contact surface is provided with a pocket sized to at least partially receive said thyristor with said second end plate in electrical contact with a wall of said pocket.

8. A device according to claim 1 wherein said first electrically conductive lead extends from said first contact surface.

9. A device according to claim 1 wherein said conductor plate includes means for aligning said conductor plate on said thyristor.

* * * * *